(12) United States Patent
Zhou et al.

(10) Patent No.: US 8,586,777 B2
(45) Date of Patent: Nov. 19, 2013

(54) LOW VOC COALESCING AGENTS

(75) Inventors: Lichang Zhou, Lawrenceville, NJ (US); Derek Pakenham, Hamilton, NJ (US); Jose Ruiz, Burlington, NJ (US); Pu Chen, Hillington Green (SG); Charles Aymes, Monmouth Junction, NJ (US); Keri Veres, Matawan, NJ (US); Bernard Koltisko, Milton, DE (US)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/331,342

(22) Filed: Dec. 20, 2011

(65) Prior Publication Data

US 2012/0095145 A1    Apr. 19, 2012

Related U.S. Application Data

(62) Division of application No. 12/322,231, filed on Jan. 30, 2009, now Pat. No. 8,106,239.

(60) Provisional application No. 61/025,065, filed on Jan. 31, 2008, provisional application No. 61/201,852, filed on Dec. 16, 2008.

(51) Int. Cl.
*C07C 69/34* (2006.01)

(52) U.S. Cl.
USPC .......................................................... 560/190

(58) Field of Classification Search
None
See application file for complete search history.

(56) References Cited

U.S. PATENT DOCUMENTS

| | | |
|---|---|---|
| 3,399,158 A | 8/1968 | Huitson |
| 4,313,733 A * | 2/1982 | Zurbuchen et al. ........ 8/582 |
| 4,525,512 A | 6/1985 | Hudson |
| 5,236,987 A | 8/1993 | Arendt |
| 5,670,701 A | 9/1997 | Denis et al. |
| 5,700,882 A | 12/1997 | Jones et al. |
| 5,753,783 A | 5/1998 | Fuller et al. |
| 6,187,385 B1 | 2/2001 | Atkins |
| 6,368,777 B1 | 4/2002 | Obuchowicz |
| 6,509,494 B1 | 1/2003 | Weir |
| 6,627,593 B2 | 9/2003 | Hei et al. |
| 6,946,502 B1 | 9/2005 | Lahtinen et al. |
| 7,078,555 B2 | 7/2006 | Bunel et al. |
| 7,160,945 B1 | 1/2007 | Van De Mark et al. |
| 7,812,079 B2 | 10/2010 | Brandenburger et al. |
| 2007/0251421 A1 | 11/2007 | Rukavina et al. |

FOREIGN PATENT DOCUMENTS

| | | |
|---|---|---|
| EP | 0026982 A1 | 9/1980 |
| EP | 0026982 * | 4/1981 |
| EP | 0615553 B1 | 6/1995 |
| JP | 4116042 | 4/2006 |
| WO | WO 2005/090501 A1 | 9/2005 |

OTHER PUBLICATIONS

Database Caplus Chemical Abstracts Service, Columbus, Ohio, US; Database Accession No. 1981:463800, Abstract of EP 26982, Friel et al.: Coating compositions containing mono- or diester coalescing agents and a substrate coated therewith.*

(Continued)

*Primary Examiner* — Karl J Puttlitz
(74) *Attorney, Agent, or Firm* — Michael B. Fein, Esq.; Eckert Seamans Cherin & Mellott, LLC

(57) ABSTRACT

A coalescent composition for coating compositions such as paints, adhesives, and coatings comprising a blend of dibasic esters, specifically (i) esters of adipic, glutaric, and/or succinic diacids and/or (ii) esters of isomers of adipic acid have advantages, including efficiency and low VOC.

14 Claims, 18 Drawing Sheets

(56) References Cited

OTHER PUBLICATIONS

Database Caplus Chemical Abstracts Service, Columbus, Ohio, US; Database Accession No. 1995:995200, Abstract of EP 678363, Sers et al.: "Emulsions containing oily compounds as release agents for molds for compositions containing hydraulic binders".*

Randall et al., Chemoxy International pp. 1-7; published by Chemoxy International (Jun. 1, 1998).*

Craig et al., Journal of the American Oil Chemists' Society (1963), 40, 61-3.*

Database Caplus Chemical Abstracts Service, Columbus, Ohio, US; Database Accession No. 1992:73028, Abstract of Ciborowski et al., PL 184160, 2002.*

Database Caplus Chemical Abstracts Service, Columbus, Ohio, US; Database Accession No. 1992:73028, Abstract of Masalov et al. Nauch.-tekhn. Ref. Sb. NII Tekhn.-ekon. Issled. Metody Analiza i Kontrolya Kachestva Produktsii (1982), (8), 4-6.*

David Randall, Chemoxy International pp. 1-7; published by Chemoxy International (Jun. 1, 1998).

"Dibasic esters offer a green alternative", ALL Business (May 1998).

FM Chuiba & O M O Habib, H Kbb Gharieb & BM Badran; "The Use of Egyptian Fusel Oil for the Preparation of Some Plasticizers Compatible with Polyvinyl Chloride"; Indian Journal of Technology, vol. 23, Aug. 1985, pp. 309-311.

Randall, David; "Recent Advance in Coalescing Solvents for Waterborne Coatings", Polymers Paint Colour Journal, Jun. 1998, vol. 188, No. 4405, pp. 12-15.

* cited by examiner

EFFECT OF LINEAR DIALKYL GLUTARATE ESTERS ON MFFT

EFFECT OF BRANCHED DIALKYL GLUTARATE ESTERS ON MFFT

EFFECT OF AGS BLENDS ON MFFT IN STYRENE/ACRYLIC LATEX

EFFECT OF AGS BLENDS ON MFFT PURE ACRYLIC

EFFECT OF AGS BLENDS ON MFFT IN A VINYL/ACRYLIC LATEX

Figure 6: Rhodiasolv DNB/M and DIA/M have VOC of less than 50%

RESIDUAL COALESCENT IN PAINT FILM - TGA ANALYSIS

PERSOZ HARDNESS

QUV EXPOSURE (1100 HOURS)

LOW VOC COALESCING AGENTS

CROSS REFERENCE TO RELATED APPLICATIONS

This application is a divisional application of U.S. application Ser. No. 12/322,231, filed Jan. 30, 2009, which claims priority to U.S. Provisional Application No. 61/025,065, filed Jan. 31, 2008 and U.S. Provisional Application No. 61/201,852 filed Dec. 16, 2008, which is incorporated herein by reference.

FIELD OF THE INVENTION

This invention relates to the field of coalescing agents and, in particular, coalescing agents utilized in coating compositions, and related methods for use and preparation thereof.

BACKGROUND OF THE INVENTION

Coalescing agents are high boiling point solvents (that are slow to evaporate) used to reduce the minimum film formation temperature (MFFT) of paints, inks, other coating compositions and the like. In paint formulations in particular, coalescing agents act as temporary plasticizers to reduce the glass transition temperature (Tg) of the latex below that of the drying temperature to allow for good film formation.

Generally, coalescing agents function by softening the polymer particles in a latex, enabling the formation of a continuous film as the coating cures. It is desirable for the coalescing agent to have low water solubility, which increases its effectiveness, and have good hydrolytic stability.

A typical paint formulation contains between 0.1-10% coalescing agent, which is used to aid in the formation of a continuous film as the paint cures. This market has been historically dominated by Eastman's Texanol™ brand ester alcohol (2,2,4-trimethyl-1,3-pentanediol monoisobutyrate). However, as Texanol™ is not compliant with current volatile organic content (VOC) regulations, there is a need for improved coalescing agents or other systems to achieve coalescence in compliance with low VOC regulations. Generally, "low VOC" coalescing agents is understood to mean about 50% less VOC content as compared to regular coalescing agents, for example, Texanol®, which contains 100% VOC content.

It is an object of the present invention to provide an improved and efficient, low VOC coalescent composition which meets present and future VOC regulations for paints and other coatings.

SUMMARY OF THE INVENTION

It is desirable to have a low VOC coalescent agent that has a lower evaporation rate (coalescents generally consist of slow evaporating solvents), that can efficiently reduce the Tg of the system, is dispersible in the latex, is compatible with all of the other paint components (pigment, surfactant, freeze-thaw stabilizer, thickeners), has low water solubility (to increases effectiveness), and has good hydrolytic stability. In one aspect, the present invention is a coalescent comprising a blend of esters of adipic, glutaric, and succinic diacids.

In one aspect, the present invention is a coalescent composition derived from one or more by-products in the production of polyamide, more specifically, polyamide 6,6. Generally, polyamide is a copolymer prepared by a condensation reaction formed by reacting a diamine and a dicarboxylic acid. More specifically, polyamide 6,6 is a copolymer prepared by a condensation reaction formed by reacting a diamine, typically hexamethylenediamine, with a dicarboxylic acid, typically adipic acid.

In one aspect, the present invention is a coalescent composition derived from one or more by-products in the reaction, synthesis and/or production of adipic acid utilized in the production of polyamide, the coalescent composition comprising a blend of esters of adipic diacids, glutaric diacids, and succinic diacids (herein referred to sometimes as "AGS" or the "AGS blend"). In one embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_4$-$C_8$ alkyl, and A comprises a mixture of —$(CH_2)_4$—, —$(CH_2)_3$—, and —$(CH_2)_2$—. In another embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_4$-$C_8$ alkyl, A is selected from the group consisting of —$(CH_2)_4$—, —$(CH_2)_3$—, and —$(CH_2)_2$—, and wherein A in the composition is a mixture of —$(CH_2)_4$—, —$(CH_2)_3$—, and —$(CH_2)_2$—. $R_1$ and $R_2$ can individually comprise a hydrocarbon group originating from fusel oil. In one embodiment, $R_1$ and $R_2$ individually can comprise a hydrocarbon group having 3 to 8 carbon atoms, and wherein $R_1$ and $R_2$ do not individually comprise an iso-butyl group. In one embodiment, $R_1$ and $R_2$ individually can comprise a hydrocarbon group having 5 to 8 carbon atoms, and wherein $R_1$ and $R_2$ do not individually comprise an iso-butyl group. In one embodiment, $R_1$ and $R_2$ can also individually comprise a glycol ether group. Typically, the glycol ether group comprises the formula:

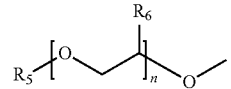

$R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is 1 or 2.

In one embodiment, the coalescent composition of the present invention comprises a blend of esters derived from by-products in the reaction, synthesis and/or production of hexamethylenediamine utilized in the production of polyamide, the coalescent composition comprising a blend of esters of adipic diacids, methylglutaric diacids, and ethylsuccinic diacids (herein referred to sometimes as "MGA" or the "MGA blend"). In one embodiment, the blend comprises adducts of alcohol and branched and/or linear diacids, the adducts having the formula $R_1$—OOC-A-COO—$R_2$ wherein $R_1$ and/or $R_2$ comprise, individually, a $C_1$-$C_8$ alkyl, more typically a $C_4$-$C_8$ alkyl, and A comprises a mixture of —$(CH_2)_4$—, —$CH_2CH_2CH(CH_3)$—, and —$CH_2CH(C_2H_5)$—. In another embodiment, the blend comprises adducts of alcohol and branched and/or linear diacids, the adducts having the formula $R_1$—OOC-A-COO—$R_2$ wherein $R_1$ and/or $R_2$ comprise, individually, a $C_1$-$C_8$ alkyl, more typically a $C_4$-$C_8$ alkyl, and A is selected from the group consisting of —$(CH_2)_4$—, —$CH_2CH_2CH(CH_3)$— and —CH$_2$CH(C$_2$H$_5$)—, and wherein A in the composition is a mixture of —(CH$_2$)$_4$—, —CH$_2$CH$_2$CH(CH$_3$)— and —CH$_2$CH(C$_2$H$_5$)—.

R$_1$ and R$_2$ can individually comprise an ethyl group. R$_1$ and R$_2$ can individually comprise a hydrocarbon group originating from fusel oil. In another embodiment, R$_1$ and R$_2$ individually can comprise a hydrocarbon group having 3 to 8 carbon atoms. In one embodiment, R$_1$ and R$_2$ individually can comprise a hydrocarbon group having 5 to 8 carbon atoms. In one embodiment, R$_1$ and R$_2$ can also individually comprise a glycol ether group. Typically, the glycol ether group comprises the formula:

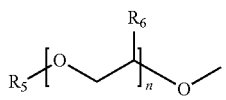

R$_5$ comprises H, or C$_1$-C$_{20}$ alkyl, aryl, alkylaryl or arylalkyl groups; "n" is an integer from 1 to 7; and R$_6$ comprises H or a methyl group. Typically, R$_5$ is a C$_1$-C$_{10}$ group, more typically, a C$_1$-C$_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In a further aspect, the present invention is a coalescent composition comprising a blend of esters of adipic diacids, methylglutaric diacids, and ethylsuccinic diacids, wherein the blend is comprises adducts of alcohol and branched and/or linear diacids, the adducts having the formula R$^1$—OOC-A-COO—R$^2$, wherein at least part of R$^1$ and/or R$^2$ are residues of at least one linear alcohol having 2 carbon atoms, or at least one linear or branched alcohol having at least 5 carbon atoms, and wherein A is a divalent linear hydrocarbon. In one embodiment, A is one or a mixture of —(CH$_2$)$_4$—, —CH$_2$CH$_2$CH(CH$_3$)—, and —CH$_2$CH(C$_2$H$_5$)—.

In yet another aspect, the present invention is an ester blend comprising adducts of branched diacids, the adducts having the formula R$^3$—OOC-A-COO—R$^4$ wherein R$^3$ and R$^4$ are the same or different alkyl groups and A is a linear or branched hydrocarbon. R$^3$ and R$^4$ can be independently selected from the group consisting of methyl, ethyl, propyl, isopropyl, butyl, n-butyl isoamyl, hexyl, heptyl and octyl.

In another aspect, the present invention comprises a coalescing aid which achieves at least a 50% reduction in VOC level versus Texanol and equivalent or better to Texanol in all other properties.

In another aspect, the invention comprises a coating composition including but not limited to paints, coatings, inks, adhesives and the like containing the coalescent or coalescing aid composition of the present invention.

DETAILED DESCRIPTION

Figure 1:
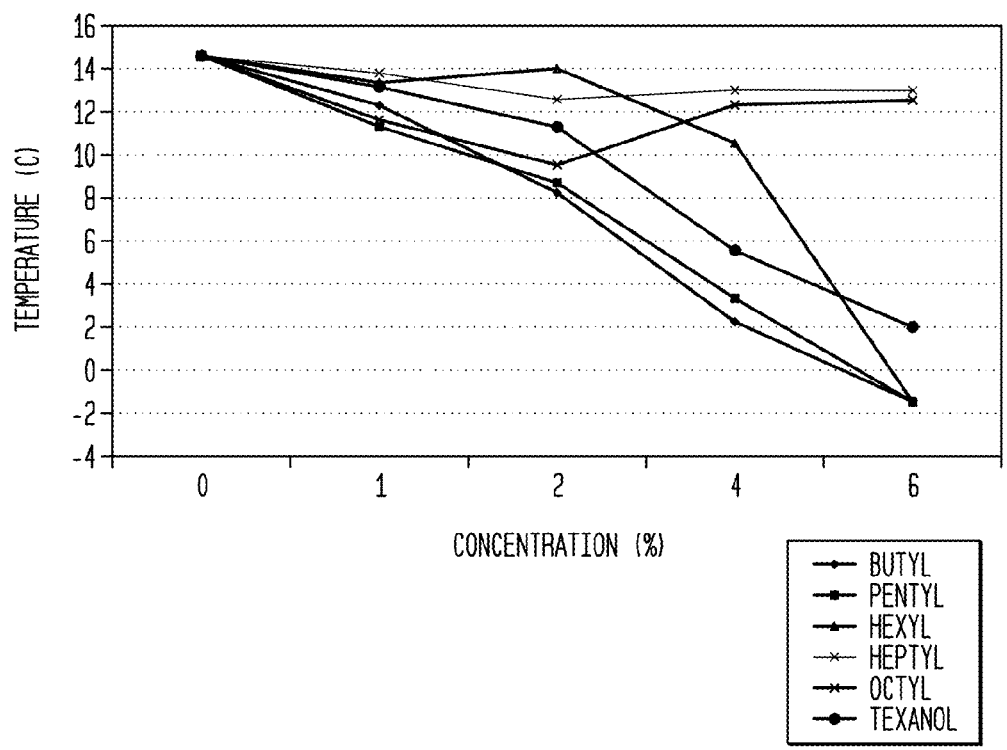
FIG. 1 is a graph illustrating the effect of varying concentrations of linear dialkyl glutarate esters of the present invention as well as the benchmark on MFFT (° C.).

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, iso-amyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted on one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

The present invention is a low VOC coalescent composition comprising a blend of dibasic esters, typically dibasic esters derived from one or more by-products in the production of polyamide, for example, polyamide 6,6. In one embodiment, the low VOC coalescent composition comprises a blend of esters of adipic diacids, glutaric diacids, and succinic diacids. In another embodiment, the low VOC coalescent composition comprises a blend of esters of adipic diacids, methylglutaric diacids, and ethylsuccinic diacids According to one embodiment of the present invention, the blend of dibasic esters corresponds to one or more by-products in the preparation of adipic acid or hexamethylenediamine, which are monomers utilized in the manufacture of polyamides. For example, the esters are obtained by esterification of one of the by-products, which generally contains, on a weight basis of the blend, from about 15% to about 33% succinic acid, from about 50% to about 75% glutaric acid and from about 5% to about 30% adipic acid. As another example, the dialkyl esters are obtained by esterification of another by-product, which generally contains, on a weight basis, from about 30% to 95% methyl glutaric acid, from about 5% to 20% ethyl succinic acid and from about 1% to about 10% adipic acid. It is understood, however, that the acid portion may be derived from such dibasic acids such as adipic, succinic, glutaric, oxalic, malonic, pimelic, suberic and azelaic acids, as well as mixtures thereof.

In most embodiments the blend has a high boiling point and 50% or less VOC as compared to commercially available coalescing agents, e.g., 2,2,4-trimethyl-1,3-pentanediol monoisobutyrate. The boiling point of the blend of the present invention is between the range of about 120° C. to 450° C. In one embodiment, boiling point of the blend of the present invention is in the range of about 160° C. to 400° C., typically in the range of about 215° C. to 400° C., more typically in the range of about 260° C. to 390° C., more typically in the range of about 280° C. to 390° C., more typically in the range of 295° C. to 390° C. In one embodiment, boiling point of the blend of the present invention is in the range of about 215° C. to 400° C., typically in the range of about 215° C. to 350° C.

In one embodiment, the blend of dibasic esters has a boiling point range of between about 300° C. and 330° C. Typically, the diisoamyl AGS blend is associated with this boiling point range. In another embodiment, the dibasic ester blend of the present invention has a boiling point range of between about 295° C. and 310° C. Typically, the di-n-butyl AGS blend is associated with this boiling point range. Generally, a higher boiling point or boiling point range corresponds to lower VOC.

In some embodiments the blend comprises adducts of alcohol and linear diacids, the adducts having the formula R—OOC-A-COO—R wherein R is ethyl, n-butyl or isoamyl and A is a mixture of —(CH$_2$)$_4$—, —(CH$_2$)$_3$—, and —(CH$_2$)$_2$—. In other embodiments, the blend comprises adducts of alcohol, typically ethanol, and linear diacids, the adducts having the formula R$^1$—OOC-A-COO—R$^2$, wherein at least part of R$^1$ and/or R$^2$ are residues of at least one linear alcohol having 4 carbon atoms, and/or at least one linear or branched alcohol having at least 5 carbon atoms, and wherein A is a divalent linear hydrocarbon. In some embodiments A is one or a mixture of —(CH$_2$)$_4$—, —(CH$_2$)$_3$—, and —(CH$_2$)$_2$—. In other embodiments A is one or a mixture of —(CH$_2$)$_4$—, —CH$_2$CH$_2$CH(CH$_3$)—, and —CH$_2$CH(C$_2$H$_5$)—. In another embodiment, R$_1$ and R$_2$ individually comprise a hydrocarbon group having 3 to 8 carbon atoms or hydrocarbon group having 4 to 8 carbon atoms; however, R$_1$ and R$_2$ do not individually comprise an iso-butyl group. In another embodiment, R$_1$ and R$_2$ individually comprise a hydrocarbon group having 5 to 12 carbon atoms or hydrocarbon group having 5 to 12 carbon atoms R$_1$ and R$_2$ can also individually comprise a glycol ether group. Typically, the glycol ether group comprises the formula:

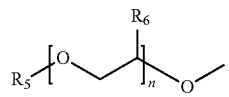

wherein R$_5$ comprises H, or C$_1$-C$_{20}$ alkyl, aryl, alkylaryl or arylalkyl groups; "n" is an integer from 1 to 7; and R$_6$ comprises H or a methyl group. Typically, R$_5$ is a C$_1$-C$_{10}$ group, more typically, a C$_1$-C$_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In another embodiment, the R$^1$ and/or R$^2$ groups can be linear or branched, cyclic or noncyclic, C$_1$-C$_{20}$ alkyl, aryl, alkylaryl or arylalkyl groups. Typically, the R$^1$ and/or R$^2$ groups can be C$_1$-C$_8$ groups, for example groups chosen from the methyl, ethyl, n-propyl, isopropyl, n-butyl, isobutyl, n-amyl, n-hexyl, cyclohexyl, 2-ethylhexyl and isooctyl groups and their mixtures. For example, R$^1$ and/or R$^2$ can both or individually be ethyl groups, R$^1$ and/or R$^2$ can both or individually be n-propyl groups, R$^1$ and/or R$^2$ can both or individually be isopropyl groups, R$^1$ and/or R$^2$ can both or individually be n-butyl groups, R$^1$ and/or R$^2$ can individually be isobutyl groups, R$^1$ and/or R$^2$ can both or individually be n-amyl groups, or R$^1$ and/or R$^2$ can be mixtures thereof (e.g., when comprising a blend of dibasic esters).

In further embodiments the invention can include blends comprising adducts of branched diacids, these adducts having the formula R$^3$—OOC-A-COO—R$^4$, wherein R$^3$ and R$^4$ are the same or different alkyl groups and A is a branched or linear hydrocarbon. Typically, A comprises isomers of a C$_4$ hydrocarbon. Examples include those where R$^3$ and/or R$^4$ can be linear or branched, cyclic or noncyclic, C$_1$-C$_{20}$ alkyl, aryl, alkylaryl or arylalkyl groups. Typically, R$^3$ and R$^4$ are independently selected from the group consisting of methyl, ethyl, propyl, isopropyl, butyl, n-butyl, iso-butyl, iso-amyl, and fusel oil.

Compounds deriving from fusel oil are known and have been described, for example, in "The Use of Egyptian Fusel Oil for the Preparation of Some Plasticizers Compatible with Polyvinyl Chloride", Chuiba et al., Indian Journal of Technology, Vol. 23, August 1985, pp. 309-311, which describes a reaction product of a fusel oil having a boiling point of 110 to 136° C. and of pure adipic or sebacic acid.

R$_3$ and R$_4$ can also individually comprise a glycol ether group. Typically, the glycol ether group comprises the formula:

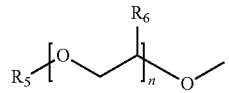

wherein R$_5$ comprises H, or C$_1$-C$_{20}$ alkyl, aryl, alkylaryl or arylalkyl groups; "n" is an integer from 1 to 7; and R$_6$ comprises H or a methyl group. Typically, R$_5$ is a C$_1$-C$_{10}$ group, more typically, a C$_1$-C$_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In yet another embodiment, the invention comprises a composition based on dicarboxylic acid diester(s) of formula $R^5$—OOC-A-COO—$R^6$ wherein group A represents a divalent alkylene group typically in the range of, on average, from 2.5 to 10 carbon atoms. $R^5$ and $R^6$ groups, which can be identical or different, represent a linear or branched, cyclic or noncyclic, $C_1$-$C_{20}$ alkyl, aryl, alkylaryl or an arylalkyl group.

The composition can correspond to a complex reaction product, where mixtures of reactants are used. For example, the reaction of a mixture of HOOC-$A^a$-COOH and HOOC-$A^b$-COOH with an alcohol $R^a$—OH can give a mixture of the products $R^a$OOC-$A^a$-COOR$^a$ and $R^a$OOC-$A^b$-COOR$^a$. Likewise, the reaction of HOOC-$A^a$-COOH with a mixture of alcohols $R^a$—OH and $R^b$—OH can give a mixture of the products $R^a$OOC-$A^a$-COOR$^a$ and $R^b$OOC-$A^a$-COOR$^b$, $R^a$OOC-$A^a$-COOR$^b$ and $R^b$OOC-$A^a$-COOR$^a$ (different from $R^a$OOC-$A^a$-COOR$^b$ if $A^a$ is not symmetrical). Likewise, the reaction of a mixture of HOOC-$A^a$-COOH and HOOC-$A^b$-COOH with a mixture of alcohols $R^a$—OH and $R^b$—OH can give a mixture of the products $R^a$OOC-$A^a$-COOR$^a$ and $R^b$OOC-$A^a$-COOR$^b$, $R^a$OOC-$A^a$-COOR$^b$, $R^b$OOC-$A^a$-COOR$^a$ (different from $R^a$OOC-$A^a$-COOR$^b$ if $A^a$ is not symmetrical), $R^a$OOC-$A^b$-COOR$^a$ and $R^b$OOC-$A^b$-COOR$^b$, $R^a$OOC-$A^b$-COOR$^b$ and $R^b$OOC-$A^b$-COOR$^a$ (different from $R^a$OOC-$A^b$-COOR$^b$ if $A^b$ is not symmetrical).

The groups $R^1$ and $R^2$, can correspond to alcohols $R^1$—OH and $R^2$—OH (respectively). These groups can be likened to the alcohols. The group(s) A, can correspond to one or more dicarboxylic acid(s) HOOC-A-COOH. The group(s) A can be likened to the corresponding diacid(s) (the diacid comprises 2 more carbon atoms than the group A).

In one embodiment, group A is a divalent alkylene group comprising, on average, more than 2 carbon atoms. It can be a single group, with an integral number of carbon atoms of greater than or equal to 3, for example equal to 3 or 4. Such a single group can correspond to the use of a single acid. Typically, however, it corresponds to a mixture of groups corresponding to a mixture of compounds, at least one of which exhibits at least 3 carbon atoms. It is understood that the mixtures of groups A can correspond to mixtures of different isomeric groups comprising an identical number of carbon atoms and/or of different groups comprising different numbers of carbon atoms. The group A can comprise linear and/or branched groups.

According to one embodiment, at least a portion of the groups A corresponds to a group of formula —(CH$_2$)$_n$— where n is a mean number greater than or equal to 3. At least a portion of the groups A can be groups of formula —(CH$_2$)$_4$— (the corresponding acid is adipic acid). For example, A can be a group of formula —(CH$_2$)$_4$—, and/or a group of formula —(CH$_2$)$_3$—.

In one embodiment, the composition comprises compounds of formula R—OOC-A-COO—R where A is a group of formula —(CH$_2$)$_4$—, compounds of formula R—OOC-A-COO—R where A is a group of formula —(CH$_2$)$_3$—, and compounds of formula R—OOC-A-COO—R where A is a group of formula —(CH$_2$)$_2$—.

In certain more specific embodiments, the blend comprises:

a diester of formula I:

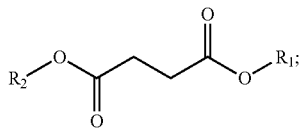

(I)

a diester of formula II:

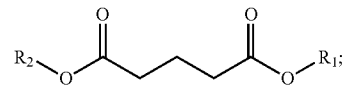

(II)

and a diester of formula III:

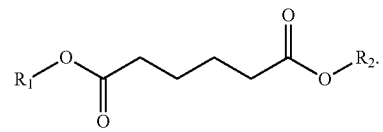

(III)

$R_1$ and/or $R_2$ can individually comprise a hydrocarbon having from about 4 to about 8 carbon atoms, typically, propyl, isopropyl, butyl, n-butyl or isoamyl. In addition, $R_1$ and/or $R_2$ can individually comprise a hydrocarbon group originating from fusel oil. In one embodiment, $R_1$ and/or $R_2$ do not individually comprise iso-butyl groups. In one embodiment, $R_1$ and/or $R_2$ individually comprise a hydrocarbon group having from about 3 to about 12 carbon atoms. In one embodiment, $R_1$ and/or $R_2$ individually comprise a hydrocarbon group having from about 3 to about 12 carbon atoms. In one embodiment, $R_1$ and/or $R_2$ individually comprise a hydrocarbon group having from about 8 to about 12 carbon atoms. The blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. Mention may be made of Rhodiasolv® RPDE (Rhodia Inc., Cranbury, N.J.).

In a further emboidment, $R_1$ and $R_2$ can individually comprise a glycol ether group. Typically, the glycol ether group comprises the formula:

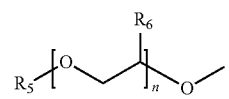

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In certain other embodiments, the blend comprises:
a diester of the formula IV:

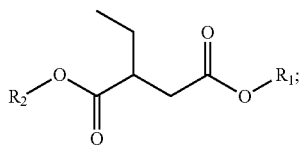

(IV)

a diester of the formula V:

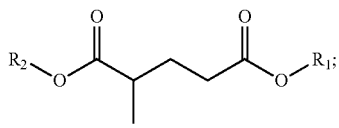

(V)

and
a diester of the formula VI:

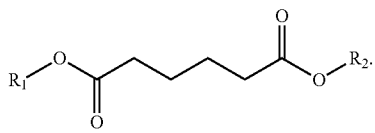

(VI)

$R_1$ and/or $R_2$ can individually comprise a hydrocarbon having from about 4 to about 8 carbon atoms, typically, methyl, ethyl, propyl, isopropyl, butyl, isobutyl, n-butyl, or isoamyl. In addition, $R_1$ and/or $R_2$ can individually comprise a hydrocarbon group originating from fusel oil. In one embodiment, $R_1$ and/or $R_2$ individually comprise a hydrocarbon group having from about 3 to about 12 carbon atoms. In one embodiment, $R_1$ and/or $R_2$ individually comprise a hydrocarbon group having from about 4 to about 12 carbon atoms. In one embodiment, $R_1$ and/or $R_2$ individually comprise a hydrocarbon group having from about 8 to about 12 carbon atoms. In a further embodiment, $R_1$ and $R_2$ can individually comprise a glycol ether group. Typically, the glycol ether group comprises the formula:

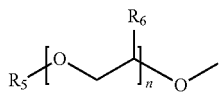

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2. In such emboidments, the blend typically comprises (by weight of the blend) (i) from about 5% to about 30% of the diester of formula IV, (ii) from about 70% to about 95% of the diester of formula V, and (iii) from about 0% to about 10% of the diester of formula VI.

In one embodiment, the blend typically comprises (by weight of the blend): (i) from about 9% to about 17% of the diester of formula IV, (ii) from about 80% to about 88% of the diester of formula V, and (iii) from about 0.5% to about 5% of the diester of formula VI.

In another emboidment, the blend comprises (by weight of the blend): (i) about 13% of the diester of formula IV, (ii) about 84% of the diester of formula V, and (iii) about 2% of the diester of formula VI. Mention may be made of Rhodiasolv® IRIS (Rhodia Inc., Cranbury, N.J.).

It is understood that when describing one or more compositions herein, it can denote a mixture of several compounds made up from a general formula as described herein. A composition can be defined by mentioning all or part of each of the precise chemical formulae of compounds present therein or by mentioning all or part of several general chemical formulae grouping together several compounds (families of compounds), if appropriate using means, or by mentioning a single general formula with means. A composition can comprises at least 50% by weight of compounds corresponding to the chemical formulae (precise formulae, or general formula (e), or mean formula (e)) used to define them, typically at least 75%, more typically at least 90%, and most typically at least 99%.

The useful compounds or useful compositions of the present invention can be prepared by any appropriate process. A process for preparing the adduct of adipic acid and of fusel oil is, for example, described in the document "The Use of Egyptian Fusel Oil for the Preparation of Some Plasticizers Compatible with Polyvinyl Chloride", Chuiba et al., Indian Journal of Technology, Vol. 23, August 1985, pp. 309-311. Use may be made of a similar process, if appropriate (for the compounds or material compositions of the invention), by replacing the adipic acid with another diacid or with a mixture of diacids of formula HOOC-A-COOH.

The compounds or material compositions can, for example, be obtained by a process comprising an "esterification" stage by reaction of a diacid of formula HOOC-A-COOH or of a diester of formula MeOOC-A-COOMe or of an acyl dichloride of formula ClOC-A-COCl or of an imide.

The reactions can be appropriately catalyzed. In one embodiment, use is made of at least 2 molar equivalents of alcohols per diacid, diester, acyl dichloride or imide. It is possible, for example, to employ from 2 to 2.5 equivalents for the reactions with the diacids, diesters or acyl dichlorides. It is possible, for example, to employ from 5 to 25, for example from 10 to 20, equivalents for the reactions with the imides. The reactions can, if appropriate, be promoted by extraction of the reaction by-products (for example, extraction by evaporation of the methanol during a transesterification starting from the diester).

The reaction can be followed by stages of filtration and/or of purification, for example by distillation. The alcohol or the mixture of alcohols can be represented by the formula R—OH, where R represents a group $R^1$ or $R^2$ or a mixture of groups $R^1$ and $R^2$. Such groups and corresponding alcohols have been described above. Fusel oil has also formed the subject of a description above.

According to a further embodiment, the operation is carried out by reaction with a diacid or a mixture of diacids. It is also possible to operate by reaction with a "light" diester of formula Me-OOC-A-COOMe.

Diacids or mixtures of diacids have been described above (by the group A) and are commercially available. Use may in particular be made of a mixture of dibasic esters of adipic acid, glutaric acid and succinic acid, sometimes referred to herein as "AGS". Use may in particular be made of a mixture of dibasic esters of adipic acid, methylglutaric acid and ethylsuccinic acid, sometimes referred to herein as "MGA". A mixture of light diesters, such as a mixture of dimethyl adipate, dimethyl glutarate and dimethyl succinate, can be employed for the transesterification reaction.

According to another embodiment, use is made, as reactant, of 2-methylglutaric acid, or of a mixture of 2-ethylsuccinic acid and 2-methylglutaric acid, or of a mixture of 2-ethylsuccinic acid, 2-methylglutaric acid and adipic acid, or of the corresponding diesters.

The latex film forming compositions can be any of the type which benefit from coalescing agents, especially compositions where low VOC is an advantage or necessary and/or efficiency is an advantage. ("Efficiency" generally meaning that less or a lower amount of the coalescing agent of the present invention is needed to achive the same MFFT as compared with the benchmark in paint. The minimum film formation temperature (MFFT) is used as a key test to measure efficiency of coalescence and reflects the ability of paint to be applied in cold weather, wherein a lower MFFT allows for a paint to be applied at lower temperatures while still maintaining acceptable coalescence properties.) The coatings of the present invention are suitable for use in a variety of architectural and industrial applications, more typically architectural applications, including but not limited to clear coatings or undercoats, floor covering coatings, wall coatings, transportation coatings, maintenance coatings, and the like or any other application where a low VOC coating composition is desired for use on a substrate.

It is understood that other additives such can be added to the coating composition including but not limited to one or more thickeners, dispersants, defoamers, surfactants, emulsifiers, rheology modifiers, wet-edge additives, whetting agents, humectants, wax, colorants, UV absorbers, pigments, freeze-thaw stabilizers, biocides, anti-oxidants, volatile plasticizers and the like, or a combination thereof.

The compositions of the present invention can be used as components of other compositions such as paint compositions. In one embodiment, the composition of the present invention is applied to various substrates, for example, wood or wooden surfaces, plastic surfaces, metal surfaces, primed or painted surfaces, and stone or cement substrates, using conventional methods including but not limited to spraying, brushing, rolling and the like.

The following examples in which all parts and percentages are by weight unless otherwise indicated are presented to illustrate a few embodiments of the invention.

EXAMPLES

Example 1

One primary characteristic of a coalescing agent is the efficiency in which it enables a consistent film to form, and this was determined by measuring the MFFT on a MFFT Bar 90. A coalescing agent having a minimum 50% reduction of VOC as analyzed via EPA Method 24 was desired to be developed. Finally, regardless of the product's efficiency or VOC, it was desirable that any additive formulated into a coating have minimal/no effect on the appearance of the film, as determined semi-quantitatively by drawing a film on glass and visually inspecting the surface for defects.

Experiment 1.1

Linear Diesters Using Glutaric Acid

A total of 10 diesters using glutaric acid were synthesized. To gain an understanding of structure vs. function, five linear and five branched alcohols were chosen. The five linear esters were n-dibutyl glutarate, n-dipentyl glutarate, n-dihexyl glutarate, n-diheptyl glutarate, and n-dioctyl glutarate and each was then mixed for one hour in Rhodopas DS-910, a styrene-acrylic latex. The MFFT and VOC results are shown in FIG. 1.

VOC is measured in a variety of way, one of which is EPA method 24. Generally, such method is an indirect measurement of the VOC content. The first step is to determine the non-volatile content of the coating by drying a known weight of coating and determining the amount of dry film left (this is the non-volatile portion). The volatile fraction of sample (including water) is determined by subtracting the non-volatile portion from the initial weight of sample. Other ASTM methods generally known in the art are used to measure the amount of water and exempt solvents in the coating, and these values are subtracted from the volatile matter, leaving what is considered to be the amount of VOC's.

TABLE 1

Concentration (%) VOC for Linear Glutarates

|  | % VOC |
|---|---|
| n-dibutyl glutarate | 51.65 |
| n-dipentyl glutarate | 20.64 |
| n-dihexyl glutarate | 9.46 |
| n-diheptyl glutarate | 4.27 |
| n-dioctyl glutarate | 2.80 |
| Texanol | 99.81 |

As shown in Table 1, the linear glutarates had lower VOC levels as compared to Texanol. The data indicates that the lower molecular weight compounds reduce the MFFT more efficiently than the larger molecular weight diesters. Without being limited by theory, it is believed that the larger molecular weight compounds have more difficultly incorporating themselves into the particles.

Experiment 1.2

Branched Glutarates

Figure 2:
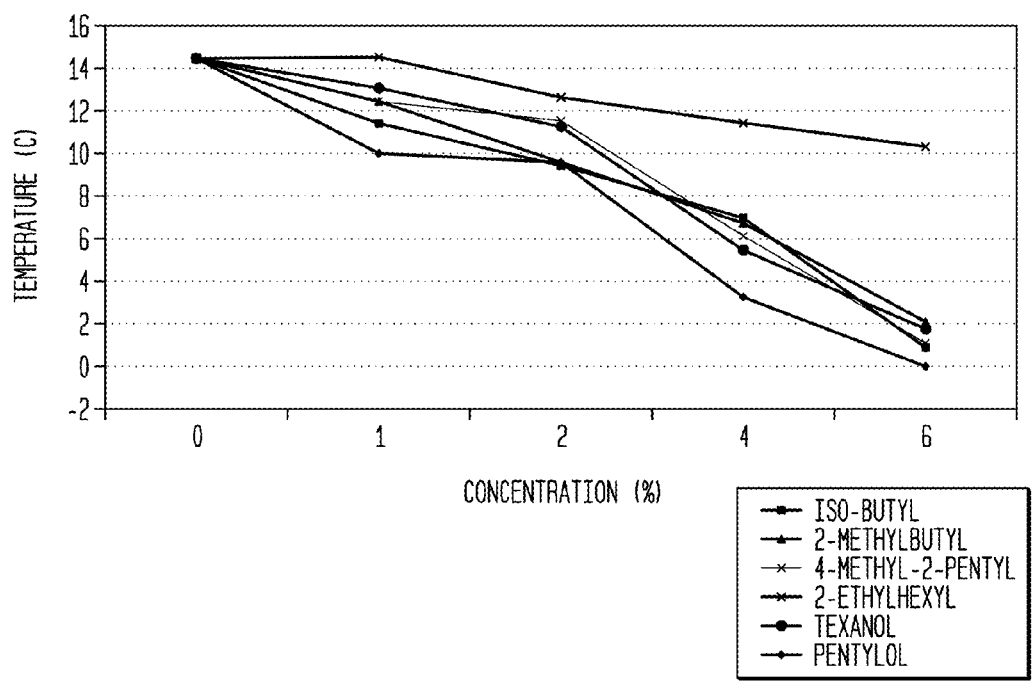
FIG. 2 is a graph illustrating the effect of varying concentrations of branched dialkyl glutarate esters of the present invention as well as the benchmark on MFFT (° C.).

The following five branched glutarates were synthesized: di-isobutyl glutarate, di-2-methylbutyl glutarate, di-4-methyl-2-pentyl glutarate, di-2-ethylhexyl glutarate, and pentylol glutarate. The pentylol was chosen because it is a waste stream blend of alcohols that is a cheaper alternative to pentyl alcohol and has a larger average molecular weight thus reducing the VOC level. The MFFT and VOC levels are shown in FIG. 2.

TABLE 2

% VOC for branched glutarates

|  | % VOC |
|---|---|
| di-isobutyl glutarate | 76.5 |
| di-(2-methylbutyl) glutarate | 28.4 |
| di-(4-methyl-2-pentyl) glutarate | 29.3 |

TABLE 2-continued

% VOC for branched glutarates

|  | % VOC |
|---|---|
| pentylol glutarate | 23.3 |
| di-(2-ethylhexyl) glutarate | 2.30 |
| Texanol | 99.81 |

As shown in Table 2, all of the branched glutarates have lower VOC levels compared to Texanol.

Experiment 1.3

Combinations of Linear and Branched Diesters

Figure 3:
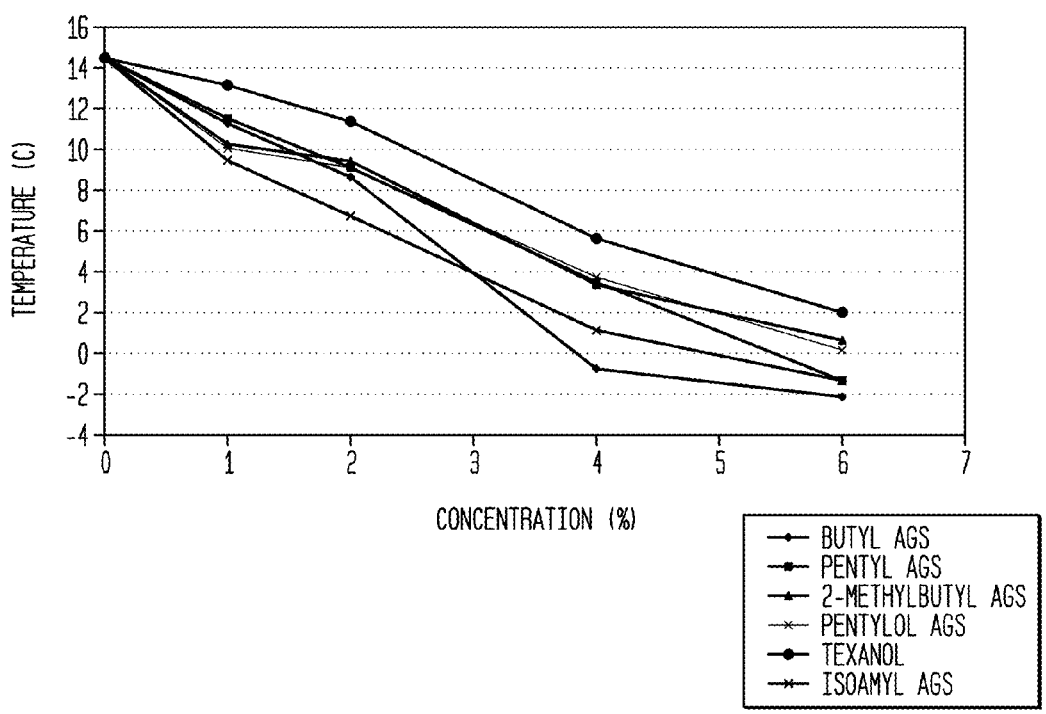
FIG. 3 is a graph illustrating the effect of varying concentrations of alkyl AGS Blend esters of the present invention as well as the benchmark on MFFT (° C.) in Styrene/Acrylic Latex.

Particular diesters from the above Experiments 1.1 and 1.2 were chosen and synthesized into the AGS esters. Another alcohol, isoamyl alcohol, was added and esterified with AGS, due to it being a cheaper alternative than the pentyl alcohol and easier to industrialize than the pentylol diester. These six diesters were analyzed the same way as previous described above. The MFFT and VOC levels are shown in FIG. 3.

TABLE 3

% VOC for AGS diesters

|  | % VOC |
|---|---|
| n-dibutyl AGS | 57.28 |
| di-(2-methylbutyl) AGS | 28.13 |
| isoamyl AGS | 25.49 |
| pentylol AGS | 23.27 |
| n-dipentyl AGS | 21.34 |
| Texanol | 99.81 |

Experiment 1.4

Testing in Pure Acrylic and Vinyl/Acrylic Latex

Figure 4:
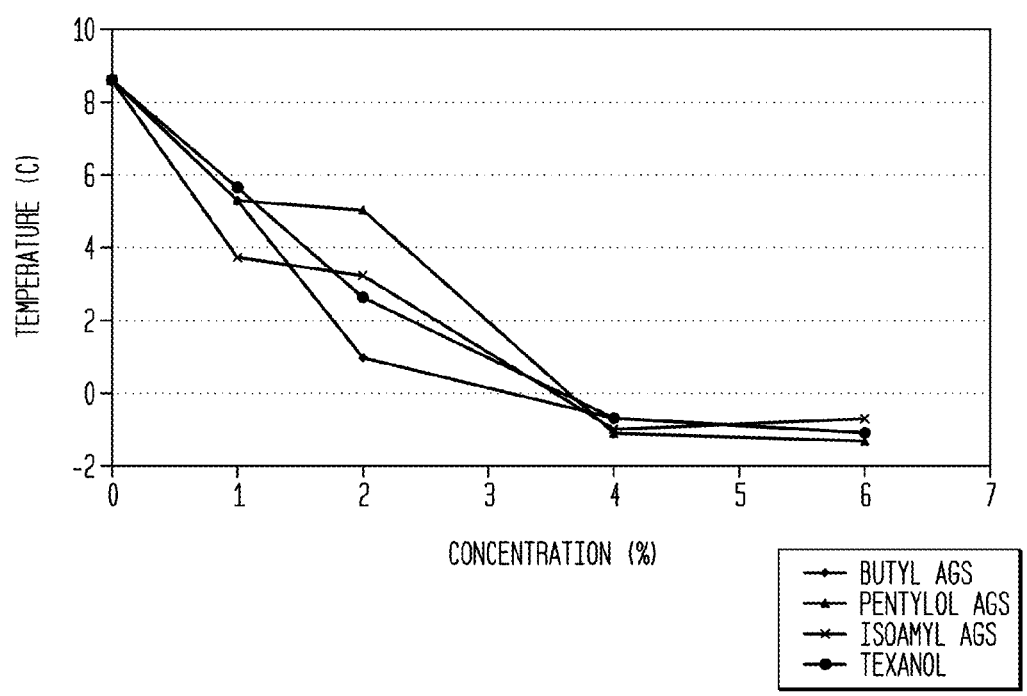
FIG. 4 is a graph illustrating the effect of varying concentrations of alkyl AGS Blend esters of the present invention as well as the benchmark on MFFT (° C.) in pure acrylic latex.
Figure 5:
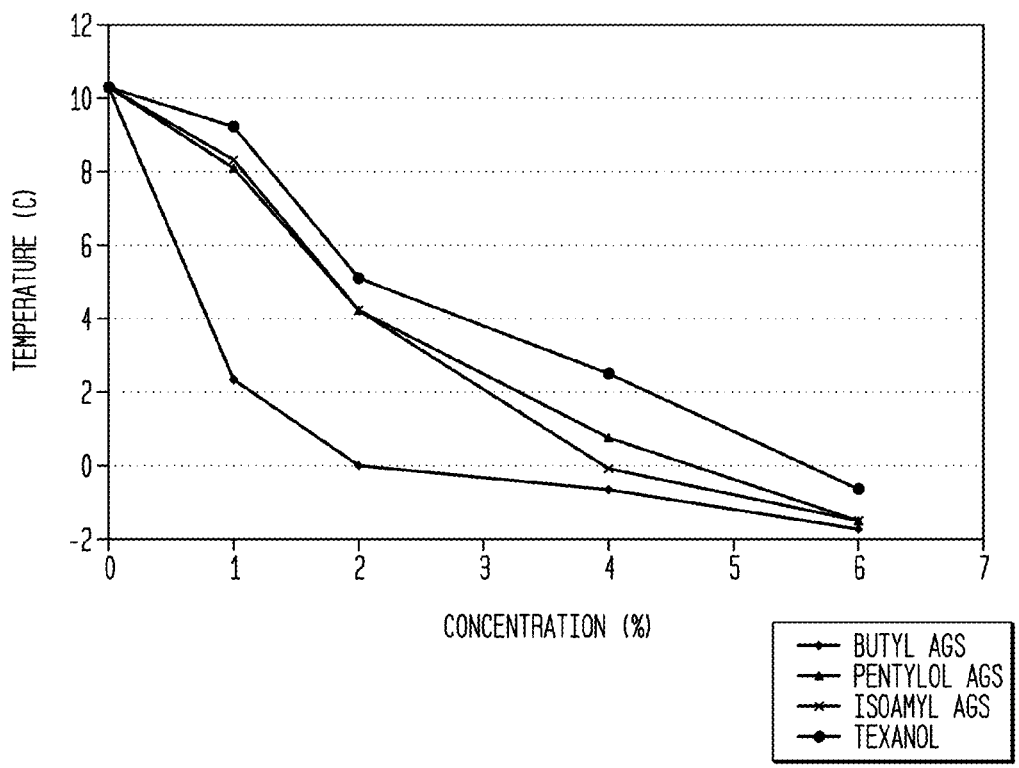
FIG. 5 is a graph illustrating the effect of varying concentrations of alkyl AGS Blend esters of the present invention as well as the benchmark on MFFT (° C.) in Vinyl/Acrylic Latex.

In order to study the effect of the AGS esters in certain systems, various ester blends, for example, butyl AGS, Pentyol AGS and Isoamyl AGS, were tested in a commercially available pure acrylic latex (referring to FIG. 4) and a commercially available vinyl/acrylic latex (referring to FIG. 5).

Without being bound by theory, the efficiency of the butyl AGS in the commercial semi-gloss paint is believed to be the result of improved solubility of the coalescing agent in a butyl acrylate rich polymer.

Experiment 1.5

Paint Formulations for AGS Diesters

All four of the AGS diesters were formulated into a commercial semi-gloss paint and into a commercial flat paint. Below is the recipe of each paint formulation with the specifications. In an attempt to ensure that the paints were as similar as possible, a master batch of the grind phase was prepared in a 1 kg steel beaker and then diluted with the appropriate latex. Next, the master batch was split and let down with the various coalescing agent, defoamer, and rheology modifier.

Commercial High Quality Interior Flat Paint, Latex F-9100

| Grind Phase | Control | | |
|---|---|---|---|
| Water | 300.00 | PVC | 44.70% |
| Natrosol 250MR | 2.00 | Volume, Solids | 30.00% |
| Kathon LX 1.5% | 1.80 | Weight, Solids | 46.60% |
| Tamol 731 | 6.00 | Viscosity, Initial | 89 KU |
| KTPP | 1.00 | Viscosity, ICI | 1.1 P |
| Rhodoline 643 | 2.00 | pH | 8.7 |
| Triton N-101 | 2.00 | VOC | 184 g/L |
| Triton N-57* | 2.00 | | |
| Propylene Glycol | 45.00 | | |
| Ti-Pure, R-902 | 200.00 | | |
| Optiwhite | 75.00 | | |
| Snowflake | 75.00 | | |
| Grind Sub | 711.80 | | |
| F-9100 | 293.90 | | |
| Let Down | | | |
| Coalescent | 13.00 | | |
| Rhodoline 643 | 2.00 | | |
| Water | 56.90 | | |
| Acrysol RM-825 | 19.00 | | |
| 28% Ammonia | 1.00 | | |
| Other Sub | 91.90 | | |
| Total | 1097.60 | | |

Commercial Interior Semigloss, Latex 629

| Grind Phase | Control | | |
|---|---|---|---|
| Water | 148.50 | PVC | 24.00% |
| Water | 20.00 | Solids, Weight | 48.30% |
| Cellosize HEC QP-4400 | 1.00 | Solids, Volume | 34.90% |
| Rhodoline 286N | 6.20 | VOC | 78.0 g/L |
| Kathon LX 1.5% | 1.50 | Stormer, KU | 100 |
| Strodex PK-OVOC | 2.00 | ICI P | 1 |
| Rhodoline 643 | 2.00 | Gloss, 60 | 50 |
| Sodium Carbonate | 2.00 | Gloss, 20 | 15 |
| Ti-Pure, R-706 | 235.00 | pH | 9 |
| Polygloss 90 | 35.00 | | |
| Rhodoline 643 | 2.00 | | |
| Water | 23.30 | | |
| Grind Sub | 478.50 | | |
| Latex 629 | 500.00 | | |
| Let Down | | | |
| Coalescent | 12.50 | | |
| Acrysol RM-2020 | 8.50 | | |
| Rhodoline 643 | 2.00 | | |
| Water | 65.00 | | |
| Other Sub | 88.00 | | |
| Total | 1066.50 | | |

The following properties were tested on each paint formulation (Commercial Interior Semigloss and Commercial High Quality Interior Flat Paint): Stormer and ICI viscosities, pH, and film appearance. The paint was allowed to equilibrate overnight and analyzed the next day. Block resistance and gloss were also tested on the semi-gloss paint. The gloss testing is important due to the fact that is generally not desirable to include, i.e., paint companies do not want, additives to reduce gloss. Block resistance is desirable as it ensures that after being painted, doorways and window frames will still open after the paint has cured. The Stormer viscosity measures low shear viscosity (e.g. mixing) and the ICI viscosity measures the high shear viscosity (e.g. paint roller, or sprayer).

TABLE 4

Data of Commercial High Quality Interior Flat Paint, Latex F-9100

| Coalescing Agent | Viscosity Stormer (KU) | Viscosity ICI (P) | pH | Film Appearance |
|---|---|---|---|---|
| Texanol | 140.8 | 0.25 | 9.93 | 8 |
| n-butyl AGS | 138.8 | 0.25 | 9.41 | 9 |
| pentylol AGS | 139.4 | 0.3 | 9.58 | 8 |
| isoamyl AGS | 140.2 | 0.3 | 9.83 | 9 |

TABLE 5

Data of Commercial Interior Semigloss Paint (Latex 629)

| Coalescing Agent | Viscosity Stormer (KU) | Viscosity ICI (P) | pH | Gloss 20 | Gloss 60 | Film Appearance | Block Resistance 1 day | Block Resistance 7 day |
|---|---|---|---|---|---|---|---|---|
| Texanol | 96.1 | 0.4 | 8.31 | 5.1 | 35.4 | 6 | 8 | 8 |
| n-butyl AGS | 101.4 | 0.6 | 8.06 | 8.8 | 40.2 | 6 | 7 | 7 |
| pentylol AGS | 105.4 | 0.9 | 7.76 | 10.0 | 42.0 | 6 | 7 | 8 |
| isoamyl AGS | 96.3 | 0.5 | 8.24 | 10.8 | 44.9 | 9 | 8 | 7 |

Isoamyl AGS is efficient in reducing the MFFT in all three types of latexes, reduces VOC levels by 75% compared to Texanol, and has excellent performance in semi-gloss paint.

Example 2

Experiments were conducted on a mixture of esters of adipic acid, methylglutaric acid and ethylsuccinic acid, sometimes referred to as "MGA". Such experiments were conducted at varying weight percent of the coalescent agent of the present invention. As stated above, a primary characteristic of the coalescing agent of the present invention is the efficiency at which it enables a consistent film to form. This was determined by measuring the MFFT on a MFFT Bar 90. The target for the coalescing agent of the present invention is for a minimum 50% reduction of VOC as analyzed via EPA Method 24. Regardless of the product's efficiency or VOC, it is desired that any additive formulated into a coating have minimal/no effect on the appearance of the film and this was determined semi-quantitatively by drawing a film on glass and visually inspecting the surface for defects.

Figure 6:
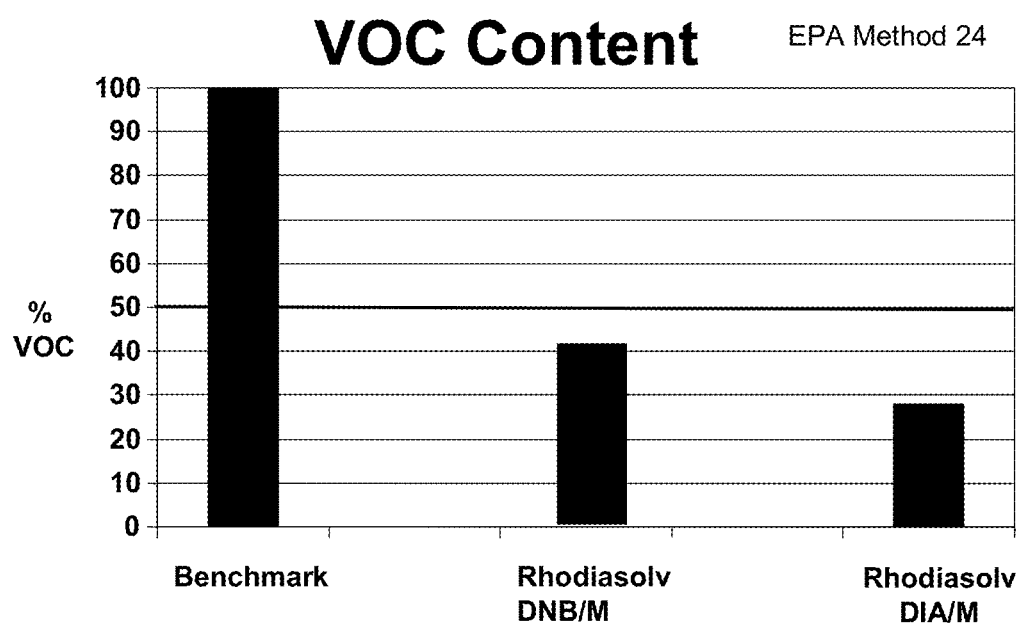
FIG. 6 illustrates the VOC content, measured via EPA Method 24, of DNB/M (di-n-butyl MGA esters) and DIA/M (di-isoamyl MGA esters) as compared with the benchmark.
Figure 7:
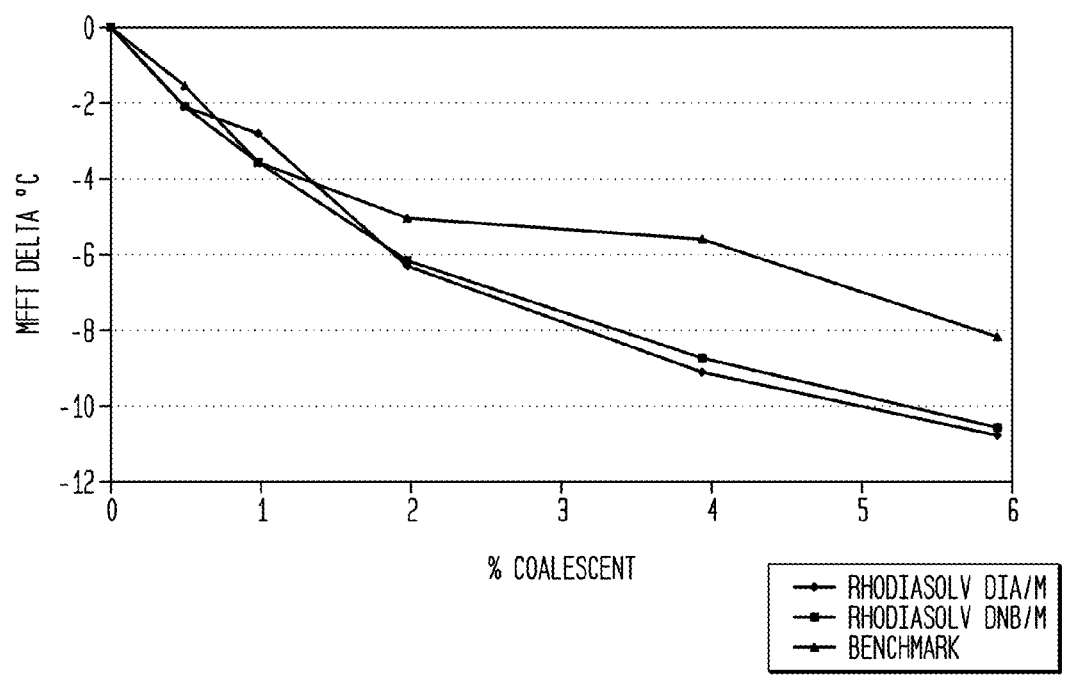
FIG. 7 shows the MFFT results for vinyl-acrylic resin comparing DNB/M and DIA/M with the benchmark.

Referring to FIG. 6, it can be seen that the VOC content, measured via EPA Method 24, of Rhodiasolv™ DNB/M (di-n-butyl MGA esters) and Rhodiasolv™ DIA/M (di-isoamyl MGA esters) have a VOC content of less than 50%. FIG. 7 shows the MFFT results for vinyl-acrylic resin comparing Rhodiasolv™ DNB/M and Rhodiasolv DIA/M with the benchmark, Texanol™. As shown in the figure, a lower amount of the coalescing agent of the present invention is needed to achieve similar MFFT as the benchmark.

Figure 8:
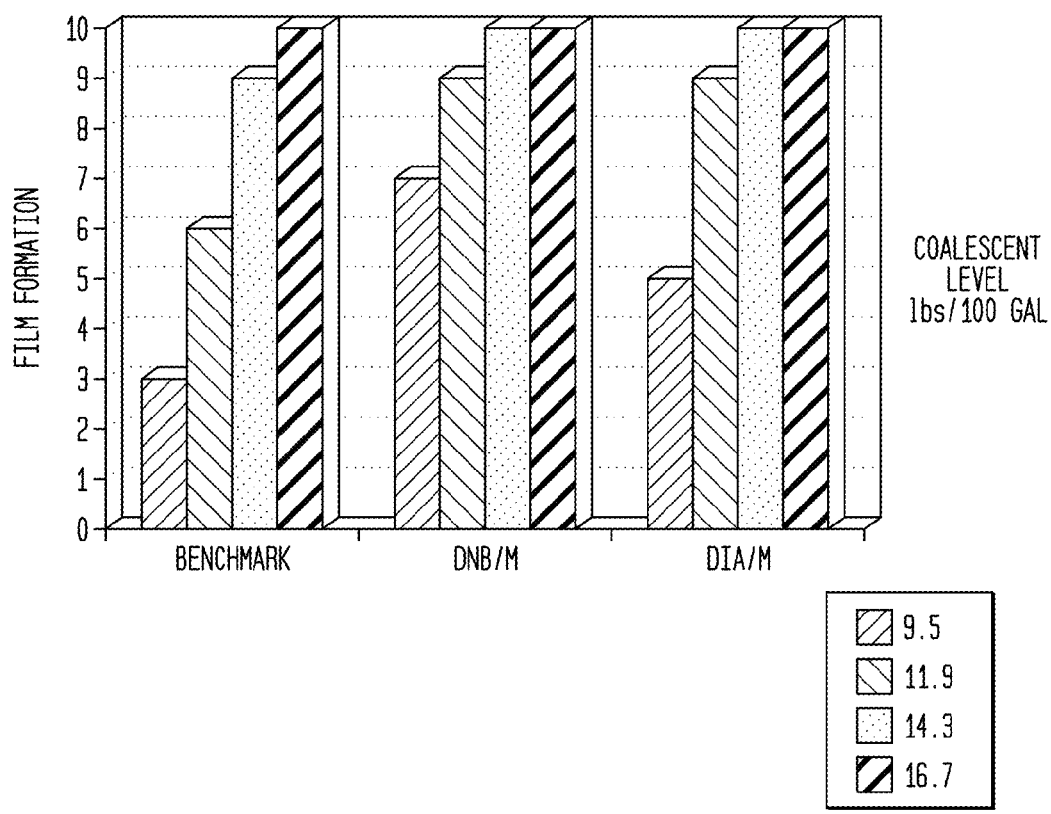
FIG. 8 shows the relative film formation at 40° F. of the benchmark, DNB/M and DIA/M coalescing agents from a scale of 0 (no film formation) to 10 (excellent film formation without cracking).

FIG. 8 shows the relative film formation at 40° F. of the benchmark, Rhodiasolv™ DNB/M and Rhodiasolv™ DIA/M coalescing agents from a scale of 0 (no film formation) to 10 (excellent film formation without cracking). The coalescing agents were introduced into semi-gloss paint formulation at various amount (lbs/gal) and measured.

TABLE 7

Properties of Semi-Gloss Paint

| | Benchmark | DNB/M | DIA/M |
|---|---|---|---|
| Viscosity (KU) | 96 | 96 | 96 |
| Viscosity (KU) 3 f/t cycles | 100 | 103 | 102 |
| 20 degree Gloss | 34.9 | 35.3 | 34.7 |
| 60 degree Gloss | 46.3 | 55.3 | 53.6 |
| Scrub resistance ASTM D-2486 | 377 | 509 | 522 |
| Flow/Leveling ASTM D-4062 | 9 | 9 | 9 |
| Adhesion 24 hrs (wet/dry) | 4/5 | 4/5 | 4/5 |
| Blister 24 hrs dry (10 = best) | 10 | 10 | 10 |

TABLE 7-continued

Properties of Semi-Gloss Paint

| | Benchmark | DNB/M | DIA/M |
|---|---|---|---|
| Block Resistance 1 day (120° F.) | 6 | 6 | 5 |
| Block Resistance 7 day (120° F.) | 8 | 8 | 7 |

Table 7 shows improved scrub resistance for Rhodiasolv™ DNB/M (di-n-butyl MGA esters) and Rhodiasolv™ DIA/M (di-isoamyl MGA esters) of 509 and 522, respectively, as compared to the Benchmark Texanol™ of 377.

Figure 9:
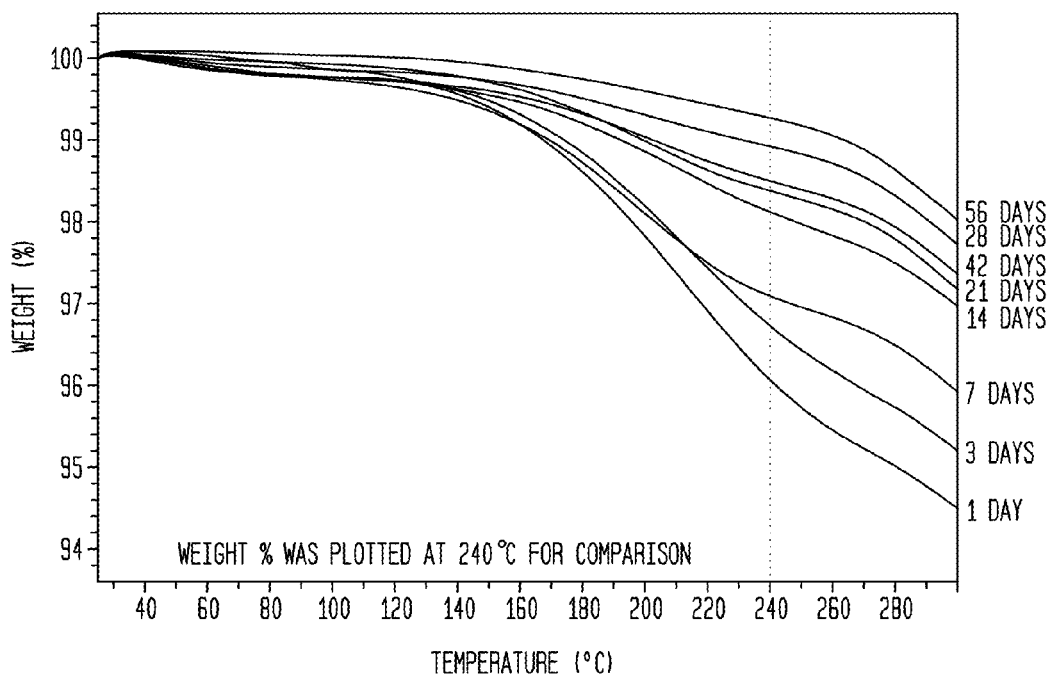
FIG. 9 illustrates the residual coalescents of the present invention in dried paint film.

Referring to FIG. 9, FIG. 9 illustrates the residual coalescents in dried paint film, specifically a TGA analysis of paint films with Rhodiasolv™ DNB/M. It was observed that Rhodiasolv™ DNB/M has a similar TGA curve as compared with the benchmark (i.e., TGA analysis of paint films with Texanol™ as the coalescent agent).

Figure 10:
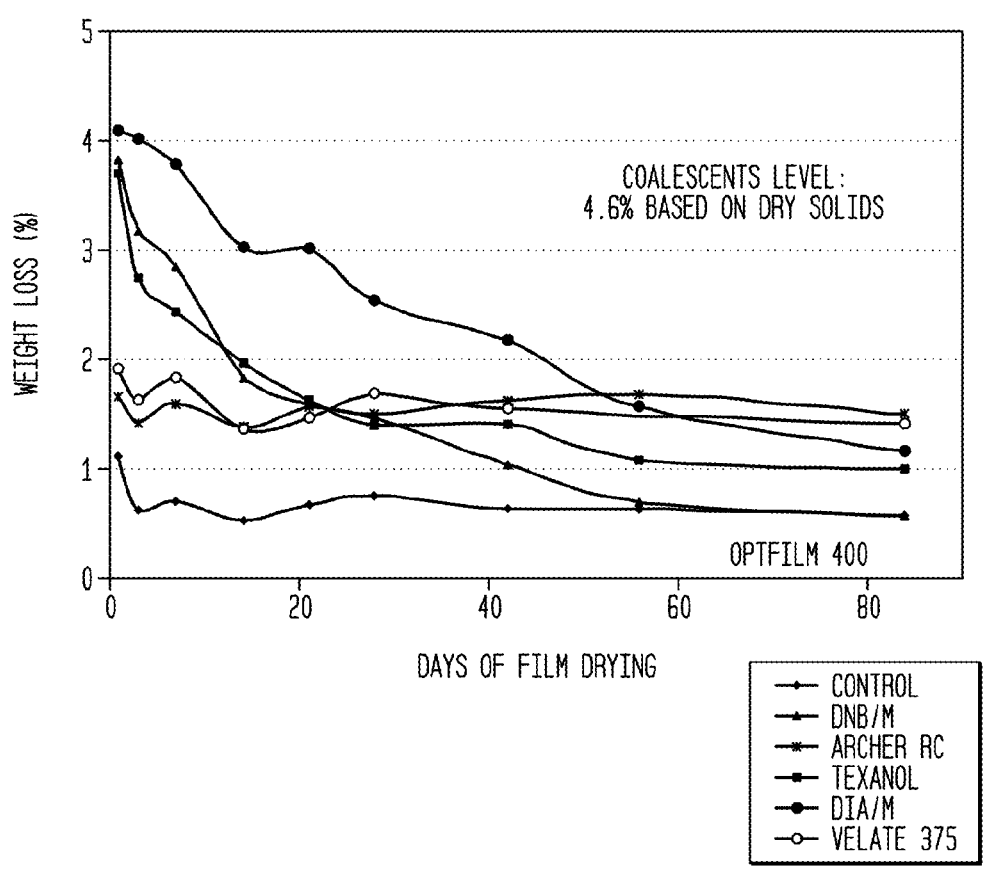
FIG. 10 shows a TGA analysis of the residual coalescent of the present invention (as well as of plasticizers and the benchmark) in paint film.
Figure 11:
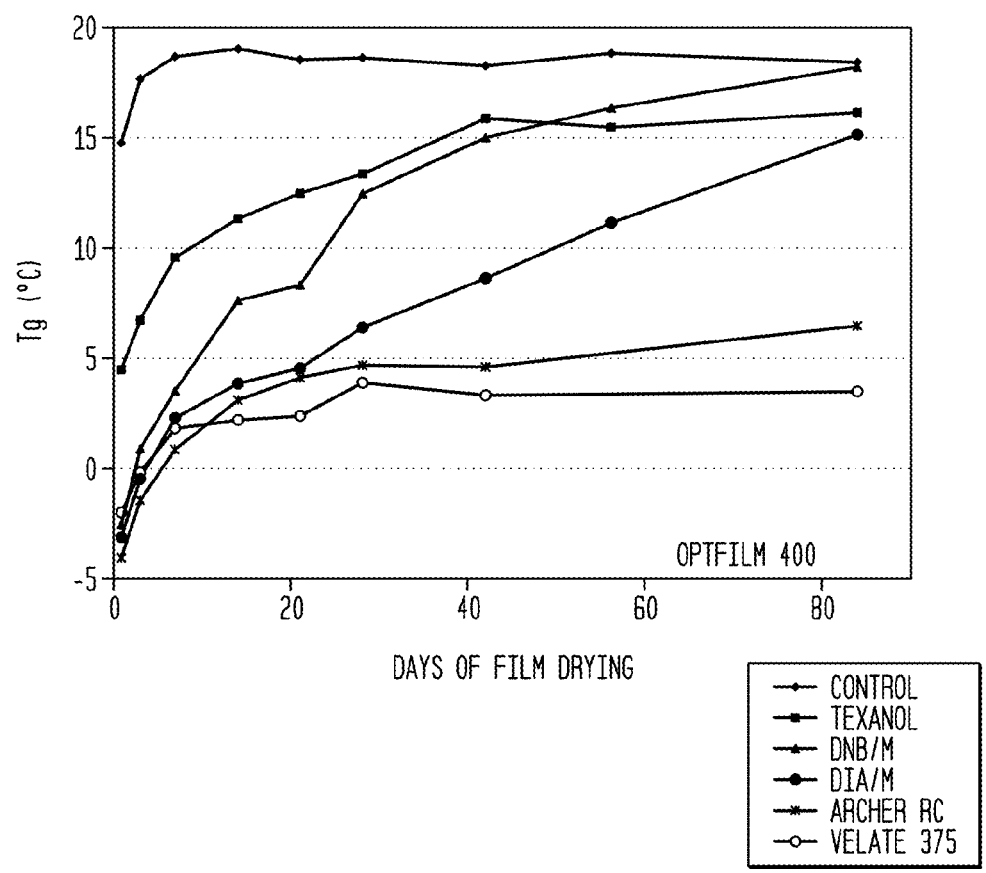
FIG. 11 is shows a DSC analysis of the residual coalescent of the present invention (as well as of plasticizers and the benchmark) in paint film.
Figure 12:
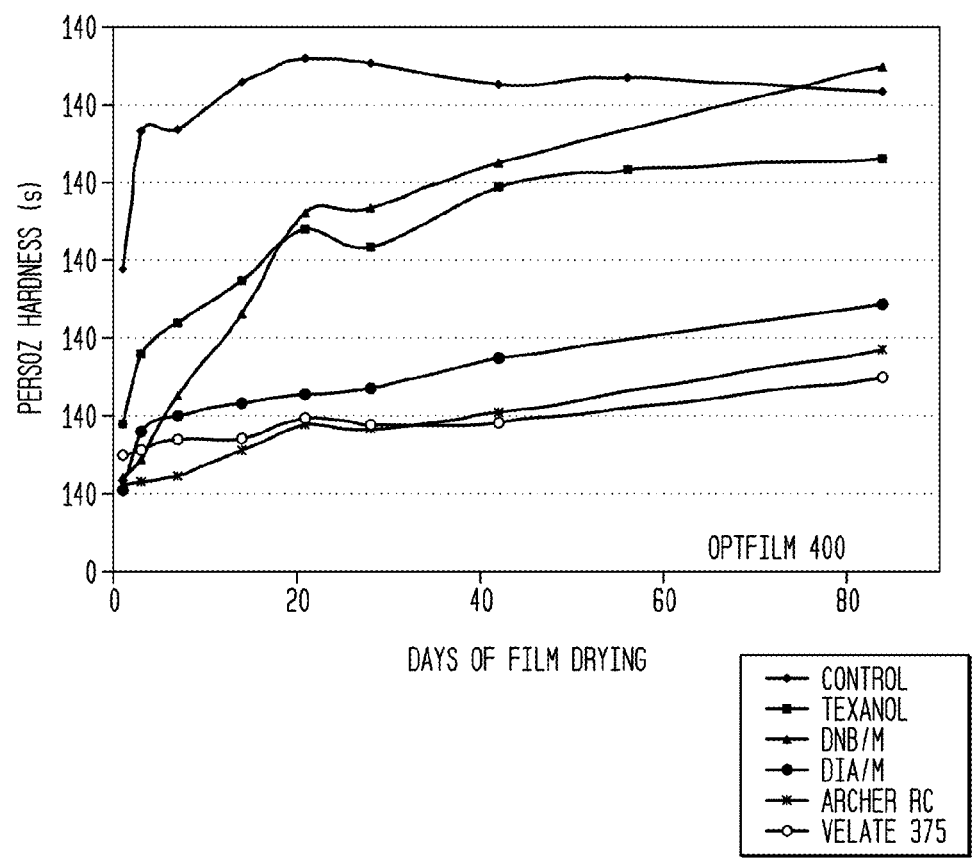
FIG. 12 shows the Persoz Hardness in paint film incorporating the coalescent compositions of the present invention (as well as of plasticizers and the benchmark).
Figure 13:
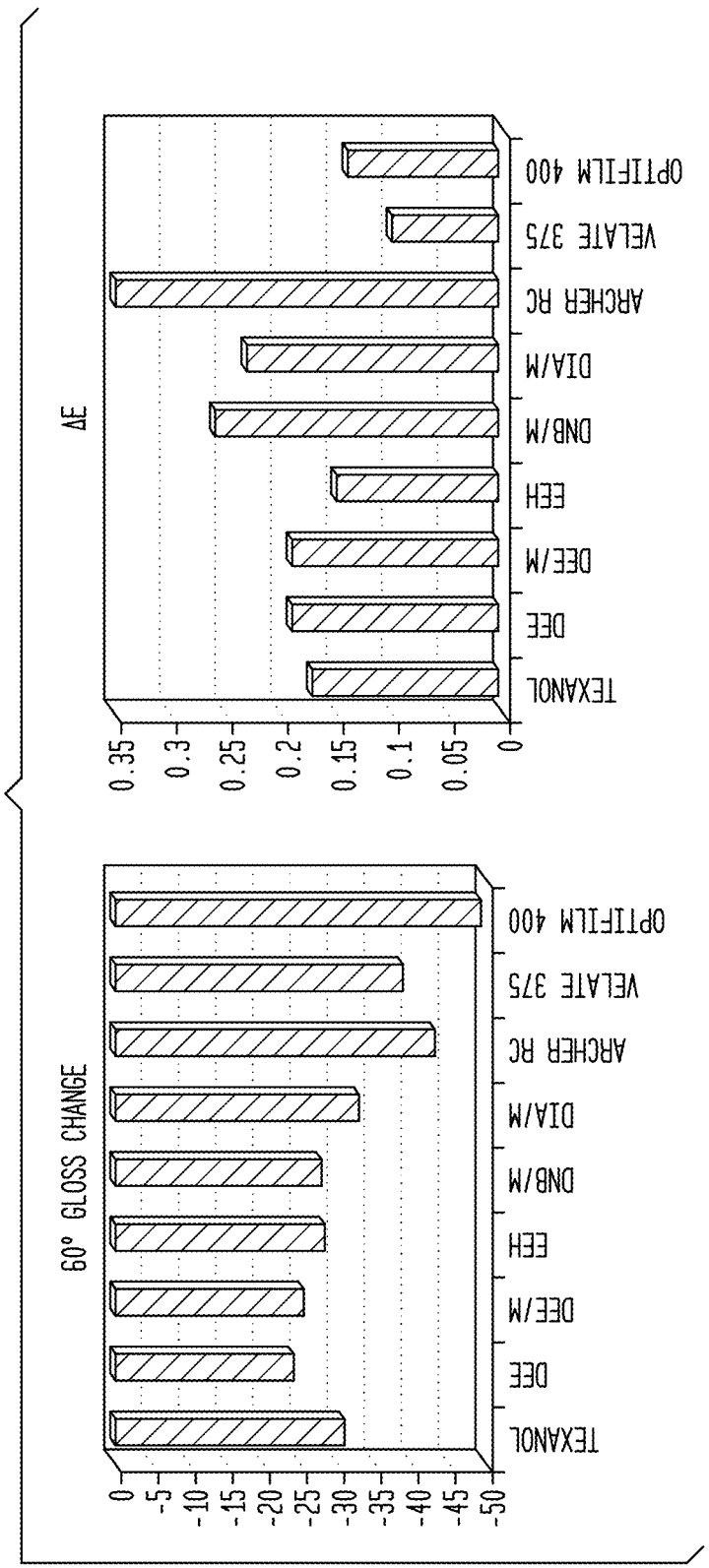
FIG. 13 illustrates the QUV exposure of films incorporating the coalescent compositions of the present invention (as well as of plasticizers and the benchmark).

Referring to FIGS. 10, 11 and 12, analyses are performed with respect to the residual coalescent agents in paint film using TGA Analysis, DSC Analysis, and Persoz hardness, respectively. Rhodiasolv™ DNB/M and DIA/M was compared to the benchmark (i.e., Texanol™) and a control (all of the aforementioned agents being temporary plasticizers), as well as to plasticizers (i.e., "Zero" VOC coalescents) Optifilm™ 400, Archer RC™ and Velate™ 375. Plasticizers such as Optifilm™ 400, Archer RC™ and Velate™ 375 plasticizers are generally used outside of the architectural coating industry and not desirable in architectural coatings because such plasticizers are not temporary plasticizer. Thus, they normally remain in the paint (thus, zero VOC) making the paint susceptible to blocking along with other un-desirable properties.

Referring back to FIG. 10, the "zero" VOC coalescents remained in the paint film at all times. Referring to FIG. 11, the "zero" VOC coalescents had a very low Tg that remained consistently low as a function of days of film drying time. Rhodiasolv™ DIA/M and Rhodiasolv™ DNB/M had a lower initial Tg compared with Texanol™. Referring to FIG. 12, the hardness of paint films with "zero" VOC coalescents was low as the (permanent) plasticizers are generally remained in the paint film, while the hardness of Rhodiasolv™ DNB/M increased more than both the "zero" VOC coalescents and Texanol™ benchmark.

Example 3

Experiments were carried out using the MGA and AGS esters of the present inventions as compared to a combination of the benchmanrk, Texanol, which is 100% VOC and a plasticizer, e.g., triethylene glycol diethylhexanoate (TEGEH), 0% VOC. (As described above, use of the plasticizer is not desirable as its use imparts poor performance characteristics such as blocking on the film.)

Because of their very high boiling point and extremely low vapor pressure, the coalescing agents of the present invention, and in particular DBM (di-butyl ester family) and DIA/M (di-iso-amyl ester family), are low VOC materials according to the USA's EPA method 24, and are VOC free based on European definition and Green Seal 11. The VOC levels of the coalescent composition by different definition, comparing to industrial standard coalescent trimethyl pentanediol monoisobutyrate ester (TMB, Texanol) and triethylene glycol diethylhexanoate (TEGEH, plasticizer), are summarized in Table 8.

TABLE 8

VOC % measured by various standards

|  | TMB | DBM | DIA/M | Plasticizer | Plasticizer/TMB (1:1) |
|---|---|---|---|---|---|
| VOC % by EPA method 24 | 100 | 41 | 28 | 0 | 50 |
| VOC % by 2004/42/EC | 0 | 0 | 0 | 0 | 0 |
| VOC % by Green Seal 11 | 100 | 0 | 0 | 0 | 50 |

As shown in Table 8, DBM and DIA/M are low odor coalescing agents and can be used in most types of latex paints and coatings, combining very high boiling point with optimal evaporation rate, without the drawback of plasticizers.

Experiment 3.1

Experiment 3.1 evaluated the compatibility and efficiency of DBM and DIA/M coalescing agents with various commercial latexes. The results showed that the coalescing agents of the present invention are more efficient compared to Texanol or Texanol/TEGEH combination, and that the coalescent agents reduced the MFFT for a variety of resin systems. As generally illustrated, roughly 15-30% less coalescing agent is needed to achieve the same level of MFFT as compared to industrial standard.

Figure 14:
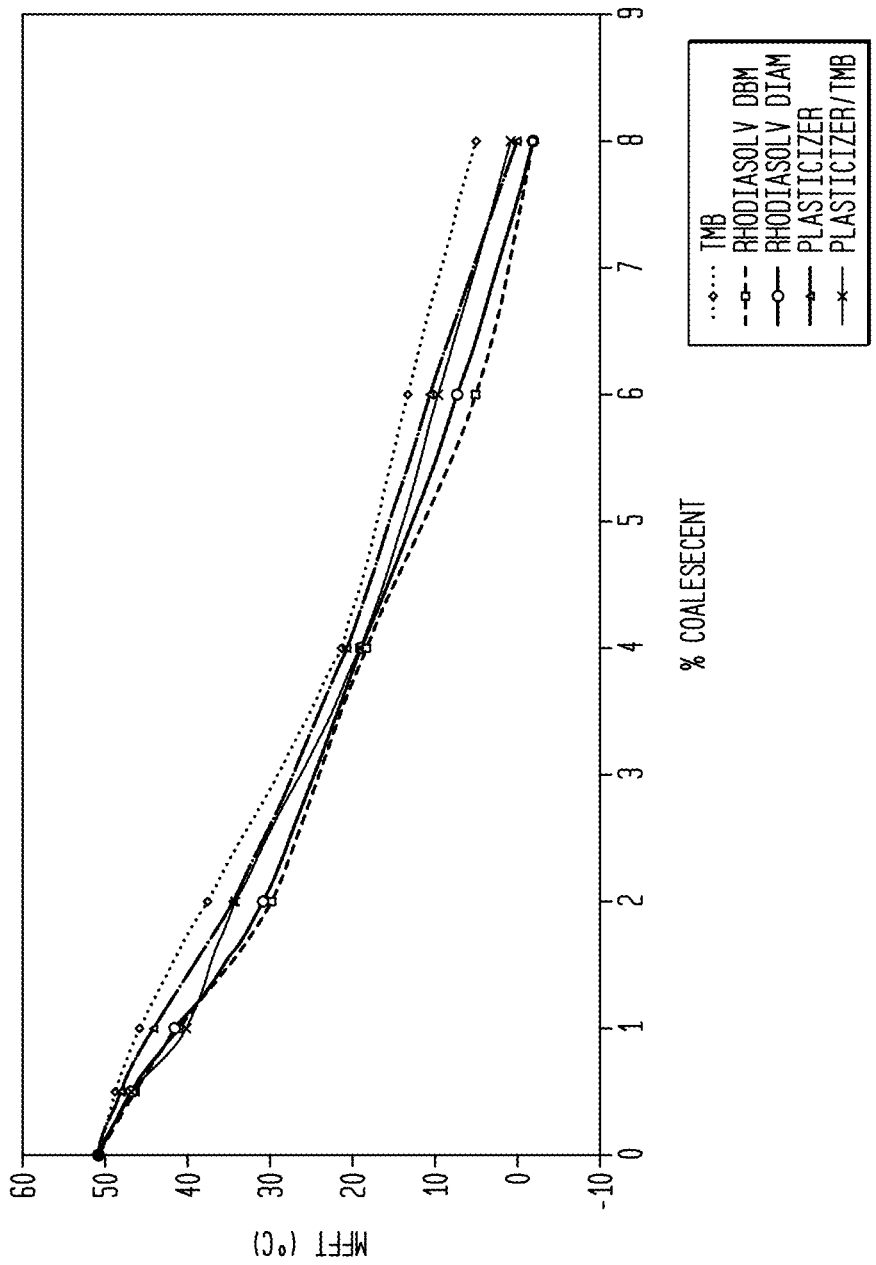
FIG. 14 is illustrates this effect of coalescing agents level on MFFT of styrene-acrylic latex using DBM and DIA/M in comparison to TMB, triethylene glycol diethylhexanoate (TEGEH, plasticizer), and the blend of plasticizer with TMB.

FIG. 14 illustrates this effect of coalescing agents level on MFFT of styrene-acrylic latex using DBM and DIA/M in comparison to TMB, triethylene glycol diethylhexanoate (TEGEH, plasticizer), and the blend of plasticizer with TMB. Referring to FIG. 14, the coalescent compositions of the present are highly efficient, meaning less amount are needed as compared to TMB, TEGEH and TMB/TEGEH and, therefore, the cost of formulation is reduced.

Experiment 3.2

Experiment 3.2 evaluated the residual coalescent agents of the present invention as compared to commercial coalescing agents in dried paint films. Paint was drawn down on the glass panels at 6 mil wet thickness. The panels were placed in the controlled temperature and humidity room at 50% relative humidity and 23° C. and allowed to dry. After the paint film was dried for 24 hours, a small piece of film was carefully removed from the glass panels. Thermogravimetric Analysis (TGA) and Differential Scanning calorimetry (DSC) analysis were carried out. Same analysis was run after the paint film was dried at certain intervals up to 12 weeks.

Figure 15:
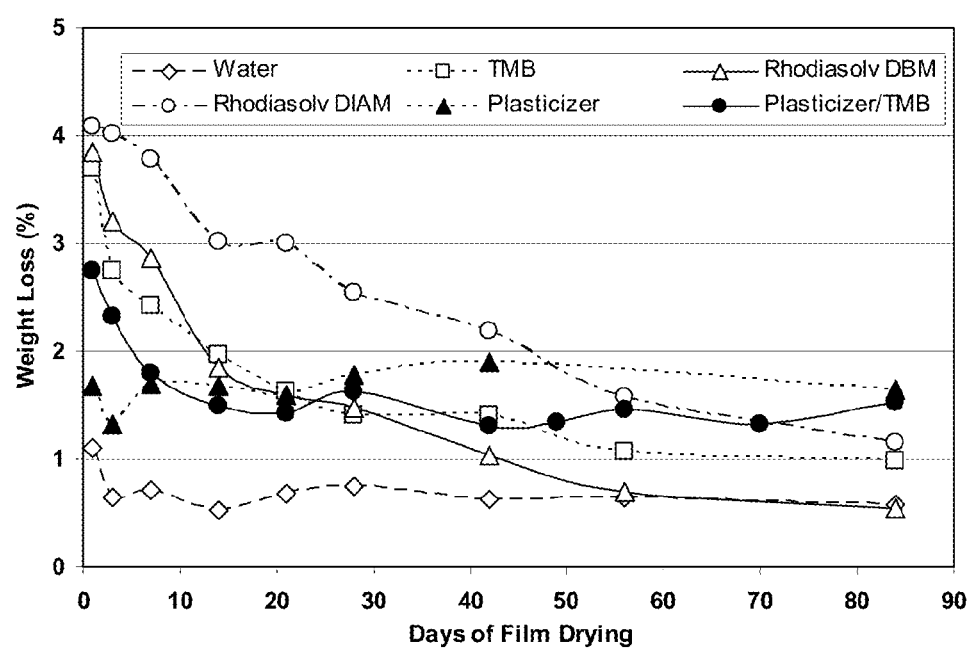
FIG. 15 illustrates the amount of residual coalescing agents in dried paint film during drying.

The residual coalescing agent level in the paint films was calculated based on the TGA analysis, and the results are given in FIG. 15. The residual amount of plasticizer didn't represent the true value that was left in the paint film since it didn't evaporate under the test conditions. However, note that the residual plasticizer remained at the same level in the film through drying. Additives such as TEGEH that claim to be as "zero" VOC coalescing agents via EPA method 24 are actually true plasticizers, i.e., did not leave the paint film. Use of TEGEH resulted in relatively softer films resulted in poor hardness and blocking resistance. It was observed the presenece of residual TMB in the paint film even after 2-3 months drying.

Figure 16:
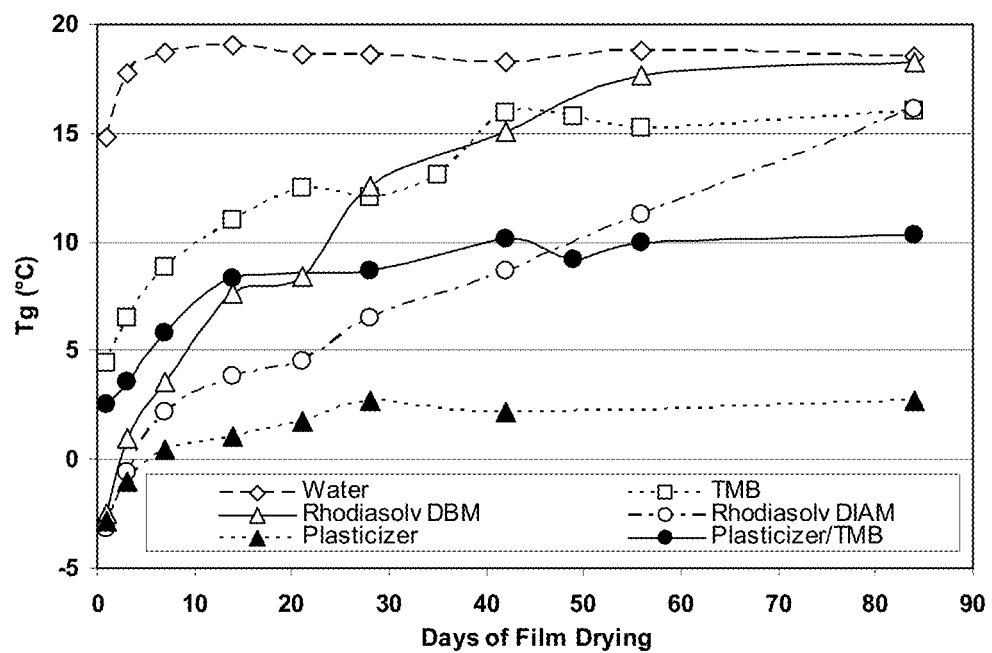
FIG. 16 shows the glass transition temperature of paint films during drying.
Figure 17:
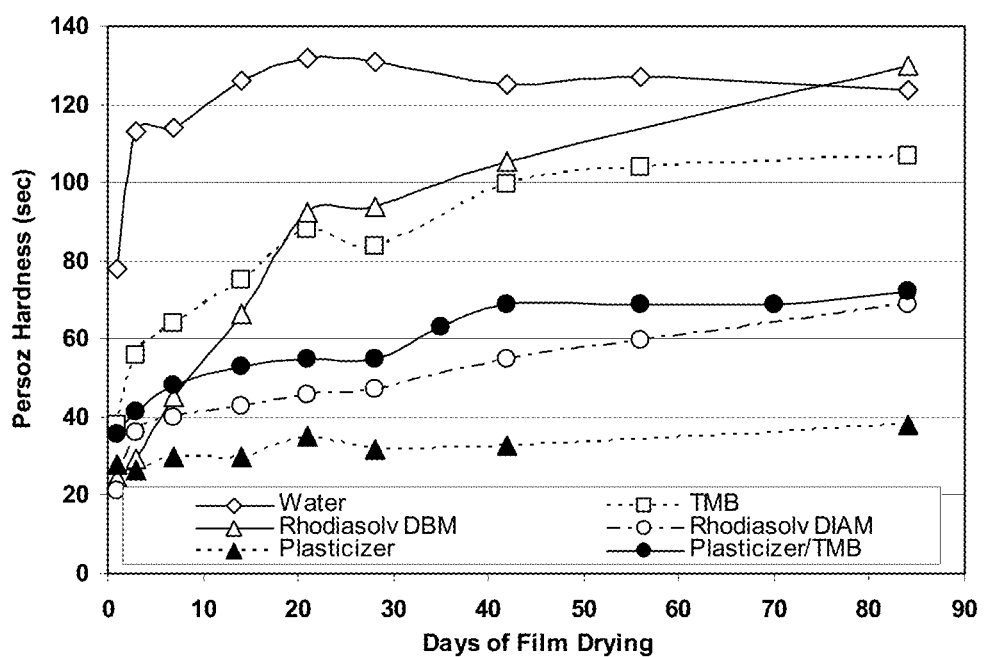
FIG. 17 illustrates persoz hardness development of paint films during drying.

The Tg of the paint films were analyzed by DSC and the hardness (Persoz Hardness) development during paint drying was monitored. The results are shown in FIGS. 16 and 17. It is very clear that the hardness and Tg of paint film containing plasticizer barely changed after the initial increase which is apparently due to the evaporation of water. Unlike plasticizers, which permanently stay in the paint film and make it softer with a lower Tg, Rhodiasolv coalescing agents leave the paint film gradually and enable the hardness and Tg of the paint to recover faster, which resulted in better paint performance such as blocking resistance. Especially Rhodiasolv DBM had much quicker Tg and hardness development than the plasticizer and it's blend with TMB (1/1), while the latter and Rhodiasolv DBM had the same VOC level measured by EPA method 24.

Experiment 3.3

Experiment 3.3 evaluated the coalescing agents of the present invention (e.g., DBM and DIAM) in paints as compared to TMB, TEGEH and TMB/TEGEH. The following data summarized the results of commercial semi-gloss latex paint using DBM and DIAM coalescing agents in comparison to industrial standard coalescent TMB and plasticizer TEGEH as well as their blend. The usage level of coalescing agents is around 4.6% based on the total solids of the paint.

TABLE 9

Paint formulation - interior semi gloss

| Ingredients | TMB | Rhodiasolv DBM | Rhodiasolv DIAM | Plasticizer | Plasticizer/TMB (1:1) |
|---|---|---|---|---|---|
| Ti-Pure R-746 | 362.0 | 362.0 | 362.0 | 362.0 | 362.0 |
| Premix the following and add to letdown | | | | | |
| Propylene glycol | 25.8 | 25.8 | 25.8 | 25.8 | 25.8 |
| Tamol 165 | 6.6 | 6.6 | 6.6 | 6.6 | 6.6 |
| Kathon LX 1.5% | 1.7 | 1.7 | 1.7 | 1.7 | 1.7 |

TABLE 9-continued

Paint formulation - interior semi gloss

| Ingredients | TMB | Rhodiasolv DBM | Rhodiasolv DIAM | Plasticizer | Plasticizer/ TMB (1:1) |
|---|---|---|---|---|---|
| Continue with letdown | | | | | |
| Rhoplex SG20 | 525.0 | 525.0 | 525.0 | 525.0 | 525.0 |
| Aqueous ammonia (28%) | 2.0 | 2.0 | 2.0 | 2.0 | 2.0 |
| Acrysol RM 2020NPR | 19.4 | 19.4 | 19.4 | 19.4 | 19.4 |
| Acrysol RM 8W | 1.7 | 1.7 | 1.7 | 1.7 | 1.7 |
| Triton GR 7M | 2.1 | 2.1 | 2.1 | 2.1 | 2.1 |
| Foamaster VL | 2.2 | 2.2 | 2.2 | 2.2 | 2.2 |
| Water | 93.7 | 93.7 | 93.7 | 93.7 | 93.7 |
| TMB | 23.8 | | | | |
| Rhodiasolv DBM | | 23.8 | | | |
| Rhodiasolv DIAM | | | 23.8 | | |
| Plasticizer | | | | 23.8 | |
| Plasticizer/ TMB (1:1) | | | | | 23.8 |
| TOTAL | 1066.0 | 1066.0 | 1066.0 | 1066.0 | 1066.0 |

Figure 18:
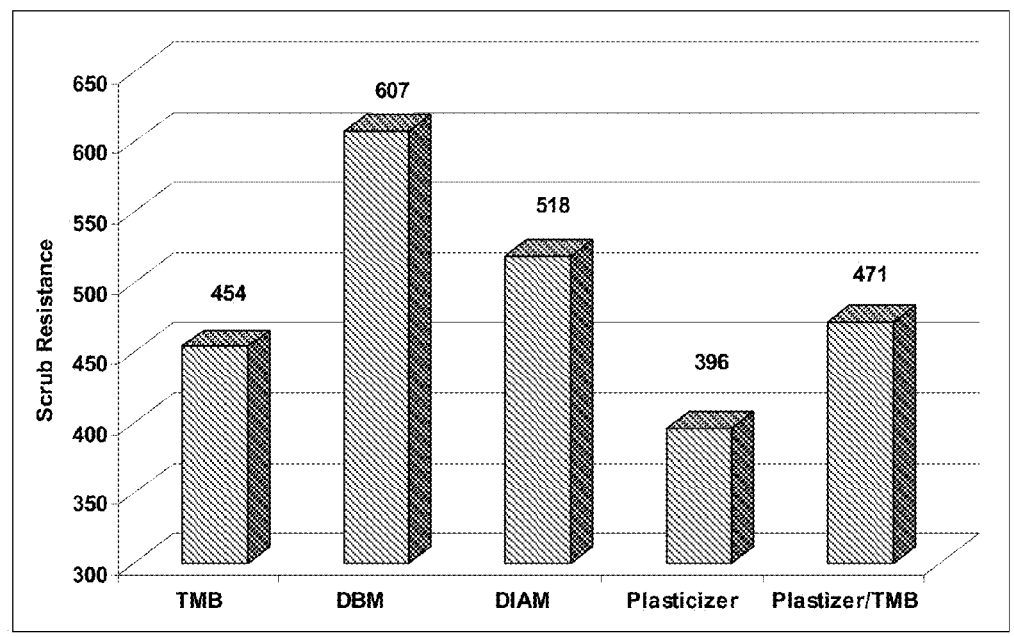
FIG. 18 illustrates the scrub resistance of semi-gloss interior paint incorporating coalescing compositions of the present invention in comparison to TMB (benchmark), TEGEH, and a blend of plasticizer with TMB.

Scrub Scrub resistance was measured according to ASTM D2486 and the results are given in FIG. 18. It was observed that Rhodiasolv DBM and DIA/M showed scrub resistance of 607 and 518, respectively, in comparison to TMB (454), plasticizer (396) and their blend (471).

The present invention, therefore, is well adapted to carry out the objects and attain the ends and advantages mentioned, as well as others inherent therein. While the invention has been depicted and described and is defined by reference to particular embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A low VOC coalescent agent composition comprising a mixture of the following diesters

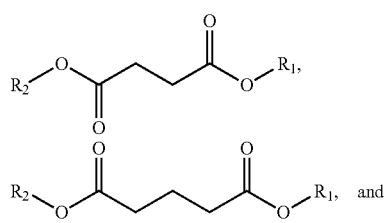

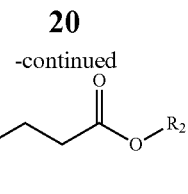

wherein $R_1$ and $R_2$ individually are an isoamyl group.

2. The composition of claim 1 wherein the composition is characterized by a boiling point of about 215° C. to about 400° C.

3. The composition of claim 1 wherein the composition is characterized by a boiling point range of about 280° C. to about 390° C.

4. The composition of claim 1 wherein the composition is characterized by a boiling point range of about 295° C. to about 390° C.

5. The composition of claim 1 wherein the composition is characterized by a boiling point range of between about 300° C. to about 330° C.

6. The composition of claim 1 wherein the composition is one or more by-products in the production of adipic acid.

7. A low VOC coalescent agent composition comprising:
about 20-28%, by weight of the composition, a diester of the formula:

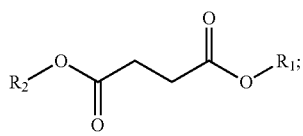

about 59-67%, by weight of the composition, a diester of the formula:

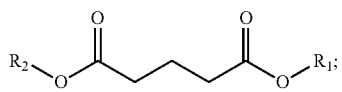

and
about 9-17%, by weight of the composition, a diester of the formula:

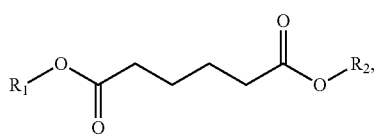

wherein $R_1$ and $R_2$ are individually an n-butyl group.

8. The composition of claim 7 wherein the composition is a by-product in the production of adipic acid.

9. A latex coating composition comprising:
(a) at least one latex polymer;
(b) water; and
(c) a low VOC coalescent agent composition according to claim 1.

10. A latex coating composition comprising:
(a) at least one latex polymer;
(b) water; and
(c) a low VOC coalescent agent composition according to claim 7.

11. The composition of claim 7 wherein the composition is characterized by a boiling point of about 215° C. to about 400° C.

12. The composition of claim 7 wherein the composition is characterized by a boiling point range of about 280° C. to about 390° C.

13. The composition of claim 7 wherein the composition is characterized by a boiling point range of about 295° C. to about 390° C.

14. The composition of claim 7 wherein the composition is characterized by a boiling point range of between about 300° C. to about 330° C.

* * * * *